(12) United States Patent
Liu et al.

(10) Patent No.: US 8,792,158 B2
(45) Date of Patent: Jul. 29, 2014

(54) 2 MICRON FEMTOSECOND FIBER LASER

(75) Inventors: Jian Liu, Sunnyvale, CA (US); Peng Wan, Fremont, CA (US); Lihmei Yang, Santa Clara, CA (US)

(73) Assignee: PolarOnyx, Inc., San Jose, CA (US)

( * ) Notice: Subject to any disclaimer, the term of this patent is extended or adjusted under 35 U.S.C. 154(b) by 327 days.

(21) Appl. No.: 13/452,817

(22) Filed: Apr. 20, 2012

(65) Prior Publication Data

US 2013/0278997 A1    Oct. 24, 2013

(51) Int. Cl.
*H01S 3/067* (2006.01)
(52) U.S. Cl.
USPC ............... 359/337.5; 359/333; 359/341.1
(58) Field of Classification Search
USPC ............ 359/333, 341.1, 337.5; 372/6
See application file for complete search history.

(56) References Cited

U.S. PATENT DOCUMENTS 6,885,683 B1 *  4/2005  Fermann et al. ............... 372/25
8,570,646 B2 * 10/2013  Fermann ...................... 359/333

* cited by examiner

*Primary Examiner* — Mark Hellner
(74) *Attorney, Agent, or Firm* — Taboada Law Firm, PLLC; John M. Taboada

(57) ABSTRACT

Methods and systems for generating femtosecond fiber laser pulses are disclose, including generating a signal laser pulse from a seed laser oscillator; using a first amplifier stage comprising an input and an output, wherein the signal laser pulse is coupled into the input of the first stage amplifier and the output of the first amplifier stage emits an amplified and stretched signal laser pulse; using an amplifier chain comprising an input and an output, wherein the amplified and stretched signal laser pulse from the output of the first amplifier stage is coupled into the input of the amplifier chain and the output of the amplifier chain emits a further amplified, stretched signal laser pulse. Other embodiments are described and claimed.

82 Claims, 13 Drawing Sheets

2 MICRON FEMTOSECOND FIBER LASER

I. STATEMENT REGARDING FEDERALLY SPONSORED RESEARCH

The U.S. Government has a paid-up license in this invention and the right in limited circumstances to require the patent owner to license others on reasonable terms as provided for by the terms of the contract GRANT NO. DE-SC0004279, for a small business innovation research project entitled "Compact 2 Micron High Power Femtosecond Fiber Laser" awarded by the Department of Energy.

II. BACKGROUND

The invention relates generally to the field of high energy femtosecond fiber lasers. More particularly, the invention relates to high energy femtosecond fiber lasers based on Thulium, Holmium, or Thulium/Holmium codoped fiber at low repetition rates.

III. SUMMARY

In one respect, disclosed is a fiber laser comprising: a seed laser oscillator comprising an output; a first amplifier stage comprising an input and an output, wherein the output of the seed laser oscillator is coupled to the input of the first stage amplifier; and an amplifier chain comprising an input and an output, wherein the input of the amplifier chain is coupled to the output of the first amplifier stage and the output of the amplifier chain is configured to emit an amplified laser pulse.

In one another respect, disclosed is a method for generating femtosecond fiber laser pulses, the method comprising: generating a signal laser pulse from a seed laser oscillator; using a first amplifier stage comprising an input and an output, wherein the signal laser pulse is coupled into the input of the first stage amplifier and the output of the first amplifier stage emits an amplified and stretched signal laser pulse; using an amplifier chain comprising an input and an output, wherein the amplified and stretched signal laser pulse from the output of the first amplifier stage is coupled into the input of the amplifier chain and the output of the amplifier chain emits a further amplified, stretched signal laser pulse.

Numerous additional embodiments are also possible.

IV. BRIEF DESCRIPTION OF THE DRAWINGS

Other objects and advantages of the invention may become apparent upon reading the detailed description and upon reference to the accompanying drawings.

Figure 1:
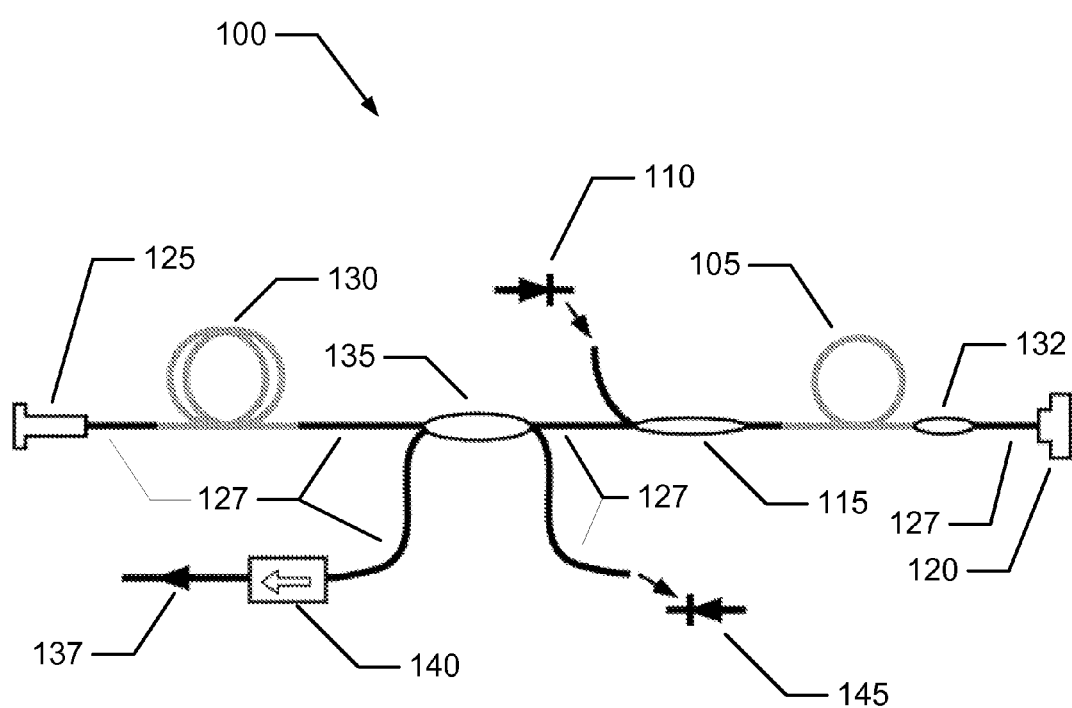
FIG. 1 is a schematic diagram of a seed laser oscillator for the 2 μm femtosecond fiber laser, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Short, high energy pulses are very promising tools for investigation of ultrafast processes in physics and chemistry. The short, high energy pulses are used in a pump-probe technique to gather information about phenomena which is unreachable by any other methods. The pump-probe technique may be used to investigate biological materials with spatial resolution below the diffraction limit using multi-photon fluorescence spectroscopy. Thulium doped short pulse fiber lasers at a wavelength around 2 micron are attracting growing interest because many molecular absorption lines are located in this spectral region. The pump-probe technique may also be used for distant diagnostics of atmosphere and other gases and liquids using high energy short pulse light detection and ranging (LIDAR). Short, high energy pulses may also be used in material processing methods to create new micro and nano sized devices and components. With each passing year, new applications for femtosecond lasers are discovered. A simple and low cost, high energy femtosecond fiber laser system would facilitate the discovery of new applications.

Passive mode locked femtosecond pulses for Tm doped fiber lasers may be generated by several methods. The methods may include the use of nonlinear polarization rotation, exotic nonlinear elements like carbon nanotube, and saturable absorbing mirrors. Use of the saturable absorbing mirror components are the most convenient and reliable and their use is very popular in many wavelength regions, but in the 2 μm region, there use is still very rare. G. Imeshev, et. al. disclosed in "230-kW peak power femtosecond pulses from a high power tunable source based on amplification in Tm-doped fiber," (Optics Express 13, 7424-7431) the use of a thulium doped fiber amplifier to boost Raman shifted pulses from a Er/Yb source to the energy of 31 nJ. The initial stretching of the pulses was provided by a piece of normal dispersion fiber, and compression occurred directly in the Tm-doped fiber of amplifier. F. Haxsen, et. al. disclosed in "Pulse energy of 151 nJ from ultrafast thulium-doped chirped-pulse fiber amplifier," (Optics Letters 35, 2991-2993) the use of regular fiber with anomalous dispersion and a grating. A normal dispersion stretcher was used to obtain a maximum energy of 151 nJ as the compression ratio of a grating stretcher can be made essentially higher than that in a short piece of Tm doped fiber.

The embodiment or embodiments described herein may solve these shortcomings as well as others by proposing a novel laser system for generation of low repetition pulse train and amplification to energy of 0.65 µJ. In the laser system, a sequence of mode locking pulse train is directly generated in a Tm doped fiber seed oscillator. The mode locked seed laser incorporates a semiconductor saturable absorber mirror and a long all-fiber cavity to reduce the low pulse repetition rate of lasing and to reach higher pulse energy by chirped pulse amplification. Simplification of the compressor is achieved by using a spool of fiber with normal dispersion in the 2 µm region to stretch the pulses before amplification. Finally, two stages of double cladding Tm doped fiber amplification boost the output power.

FIG. 1 is a schematic diagram of a seed laser oscillator for the 2 µm femtosecond fiber laser, in accordance with some embodiments.

Figure 2:
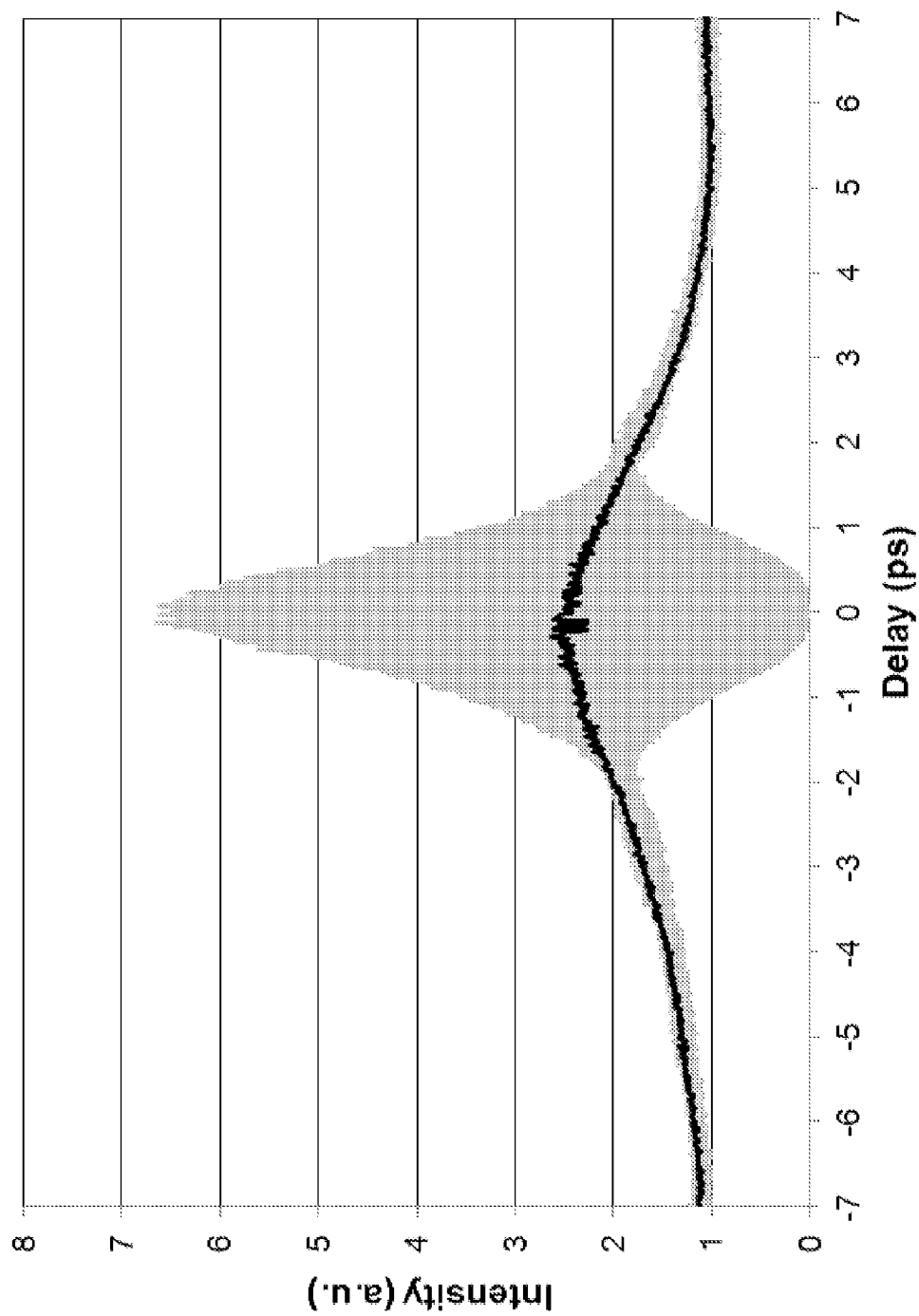
FIG. 2 is an autocorrelation trace of the output from the seed oscillator, in accordance with some embodiments.

In some embodiments, the seed laser oscillator for the 2 µm femtosecond fiber laser comprises a linear cavity and incorporates a semiconductor saturable absorber mirror and a long all-fiber cavity to reduce the low pulse repetition rate of lasing and to reach higher pulses energy by chirped pulse amplification. The seed laser oscillator 100 comprises a 5 m long double clad Tm doped laser active medium fiber 105 with a core diameter of 6 µm and a 0.23 numerical aperture (NA). The gain fiber 105 is pumped by one multimode laser diode 110 with a wavelength in the range of 790-796 nm, 1200-1220 nm, or 1570-1620 nm. In this embodiment, the multimode laser diode 110 has a wavelength of 793 nm. Alternatively, the pump laser can be one or more single mode laser diodes or multiple multimode laser diodes. Alternatively, the pump wavelength may be 1210 nm or 1600 nm depending on the medium selected for the gain fiber. Alternative gain mediums for the gain fiber include Holmium and Thulium/Holmium codoped fiber. The gain fiber may be either single clad or double clad having a core diameter ranging from 5 µm to 200 µm with numerical apertures ranging from 0.02 to 0.25. A multimode signal/pump combiner 115 is used to couple pump power from the multimode laser diode 110 into the gain fiber 105. This pumping scheme allows the use of inexpensive, high power multimode laser diodes that are wavelength matched to the Tm strong absorption band. The central wavelength of the laser is around 2 µm without any filter. One mirror of the seed laser oscillator cavity is a butt coupled, semiconductor saturable absorber mirror (SESAM) 120 with a modulation depth of 20%, a relaxation time of 500 fs, and a saturation fluence of 35 µJ/cm$^2$. The SESAM is commercially available from BATOP GmbH. The other cavity mirror comprises a fiber pigtailed gold reflector 125. To facilitate mode locking and to partly compensate for the positive dispersion of +40 ps/nm/km from the overall single mode fiber 127 of the seed laser oscillator cavity, a section of dispersion compensating fiber 130 of 30 m in length with a normal dispersion of −12 ps/nm/km is used in the seed laser oscillator cavity. The dispersion compensating fiber 130 has high concentrations of germanium and small mode-field diameter and operates at normal dispersion. The net dispersion of the seed laser oscillator cavity is reduced to −0.085 ps$^2$. In order to remove the pump light injected into the cladding of the overall single mode fiber 127 by the inner cladding of the gain fiber 105, a pump stripper 132 is used to scatter the pump light into the ambient air. If the gain fiber 105 is pumped by one or more single mode laser diodes, then the pump stripper is not required. An output coupler 135 is used to couple out from the seed laser oscillator cavity. Output couplers with various coupling coefficients ranging between 0% to 100% may be used. The minimum allowable coupling coefficient depends on the single pass gain from the gain medium. In order to generate output laser pulses, the minimum coupling coefficient times the single pass gain must be greater than one. The higher the coupling ratio, the higher the output signal power. The seed laser oscillator cavity 100 is able to generate stable, self-started, mode locked pulses 137 with 700 mW of pumping. The fluctuation of pulse amplitude is within 3%. Locating the output coupler 135 at the point where the pulses have maximum stretching, results in pulses emitted from the seed oscillator 137 with anomalous chirp and duration of 2.6 ps. FIG. 2 shows the autocorrelation trace of the output from the seed oscillator 137 having a bandwidth of 8 nm corresponding to a 0.55 ps duration in transform-limited pulses. Since the output pulses from the seed laser oscillator cavity are to be further amplified, it is not necessary to compensate for chirp at this point, With an 85% output coupling coefficient output coupler, output powers up to 25 mW from the seed laser oscillator cavity are obtainable. The total cavity length in this embodiment is 40 m, which corresponds to a 2.5 MHz pulse repetition rate. Depending on the total cavity fiber length, the repetition rate for the seed laser oscillator may range from 100 kHz to 1,000 MHz for total cavity fiber lengths ranging from 1,000 m to 0.1 m. Having such a low repetition frequency eliminates the necessity of a pulse picker such as an acousto-optic pulse picker, thus making it quite convenient for achieving high pulse energy. Since the seed laser oscillator cavity emits a weakly-polarized signal, a pigtailed polarization maintaining isolator 140 may be spliced to the output of the seed laser oscillator cavity. Additionally, a monitor 145, such as a photodiode, may be used to monitor the output pulse train from the seed laser oscillator cavity. Subsequently, the pulses from the seed laser oscillator cavity are amplified in one or more amplifiers and ultimately compressed in a polarization sensitive pulse compressor after amplification.

Figure 3:
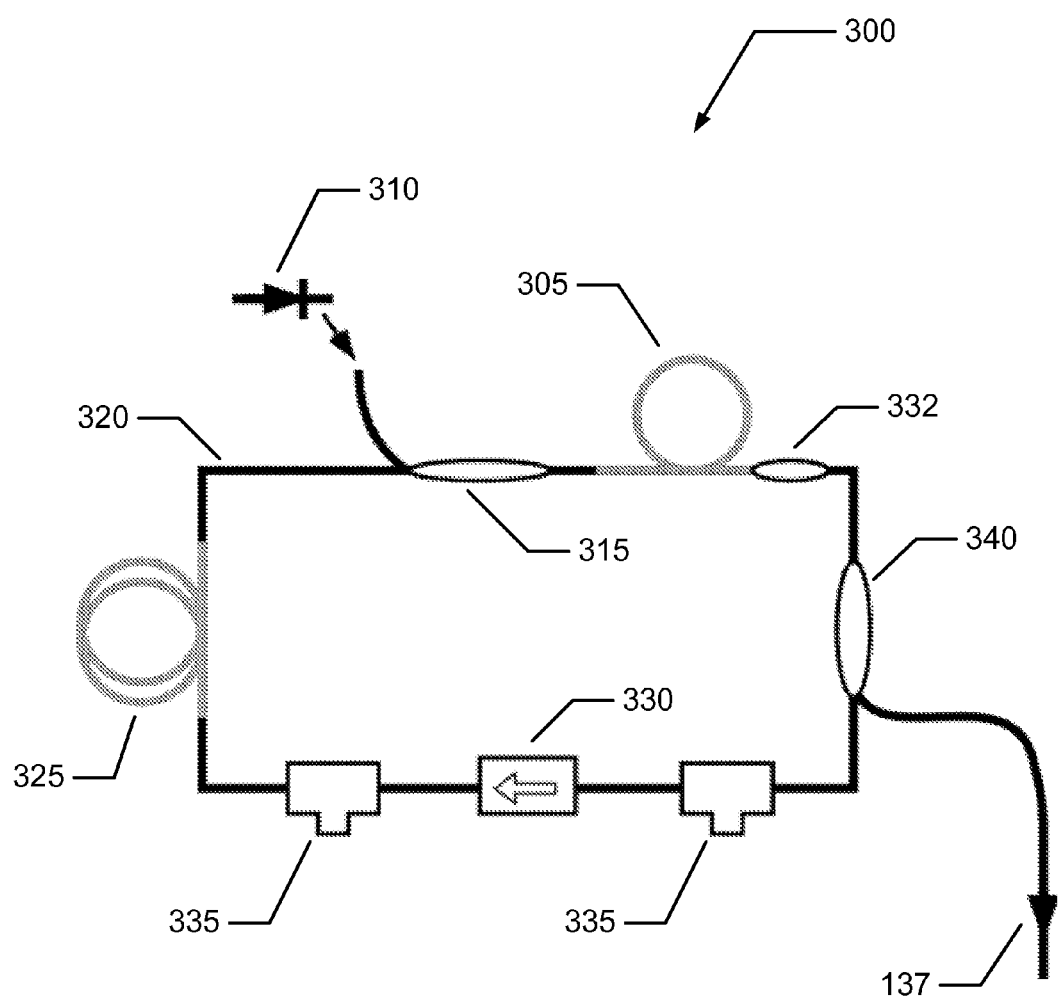
FIG. 3 is a schematic diagram of a seed laser oscillator for the 2 μm femtosecond fiber laser, in accordance with some embodiments.

FIG. 3 is a schematic diagram of a seed laser oscillator for the 2 µm femtosecond fiber laser, in accordance with some embodiments.

In some embodiments, the seed laser oscillator for the 2 µm femtosecond fiber laser comprises a ring cavity and incorporates in-line polarization controllers and isolator. The seed laser oscillator 300 comprises a 5 m long double clad Tm doped laser active medium fiber 305 with a core diameter of 6 µm and a 0.23 numerical aperture (NA). The gain fiber 305 is pumped by one multimode laser diode 310 with a wavelength in the range of 790-796 nm, 1200-1220 nm, or 1570-1620 nm. In this embodiment, the multimode laser diode 310 has a wavelength of 793 nm. Alternatively, the pump laser can be one or more single mode laser diodes or multiple multimode laser diodes. Alternatively, the pump wavelength may be 1210 nm or 1600 nm depending on the medium selected for the gain fiber. Alternative gain mediums for the gain fiber include Holmium and Thulium/Holmium codoped fiber. The gain fiber may be either single clad or double clad having a core diameter ranging from 5 μm to 200 μm with numerical apertures ranging from 0.02 to 0.25. A multimode signal/pump combiner 315 is used to couple pump power from the multimode laser diode 310 into the gain fiber 305. This pumping scheme allows the use of inexpensive, high power multimode laser diodes that are wavelength matched to the Tm strong absorption band. The central wavelength of the laser is around 2 μm without any filter. In order to remove the pump light injected into the cladding of the overall single mode fiber 320 by the inner cladding of the gain fiber 305, a pump stripper 332 is coupled to the output of the gain fiber 305 and is used to scatter the pump light into the ambient air. If the gain fiber 305 is pumped by one or more single mode laser diodes, then the pump stripper is not required. To facilitate mode locking and to partly compensate for the positive dispersion from the overall single mode fiber 320 of the seed laser oscillator ring cavity, a section of dispersion compensating fiber 325 with a normal dispersion is used in the seed laser oscillator cavity. The dispersion compensating fiber 325 has high concentrations of germanium and small mode-field diameter and operates at normal dispersion. The seed laser oscillator ring cavity also has an in line polarization isolator 330 surrounded on both ends by in line polarization controllers 335 in order to induce mode locking. An output coupler 340 is used to couple out from the seed laser oscillator cavity. Output couplers with various coupling coefficients ranging between 0% to 100% may be used. The minimum allowable coupling coefficient depends on the single pass gain from the gain medium. In order to generate output laser pulses, the minimum coupling coefficient times the single pass gain must be greater than one. The seed laser oscillator cavity 300 is able to generate stable, self-started, mode locked pulses 137.

Figure 4:
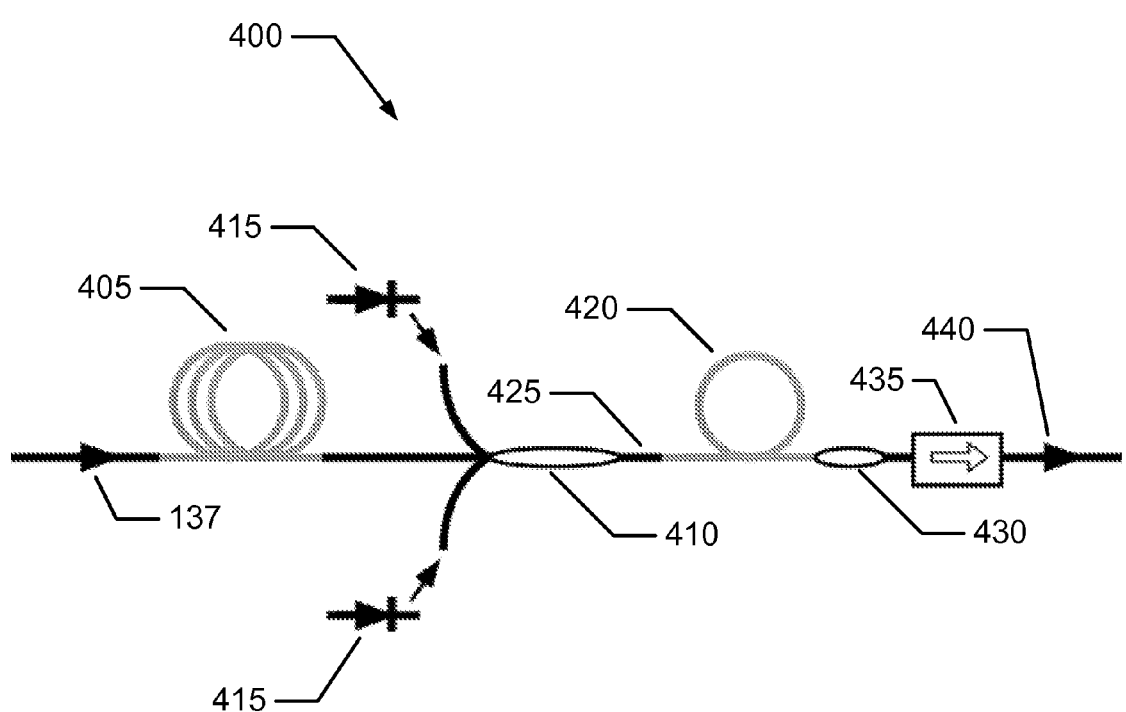
FIG. 4 is a schematic diagram of the first stage amplifier for the 2 μm femtosecond fiber laser, in accordance with some embodiments.

FIG. 4 is a schematic diagram of the first stage amplifier for the 2 μm femtosecond fiber laser, in accordance with some embodiments.

Figure 5:
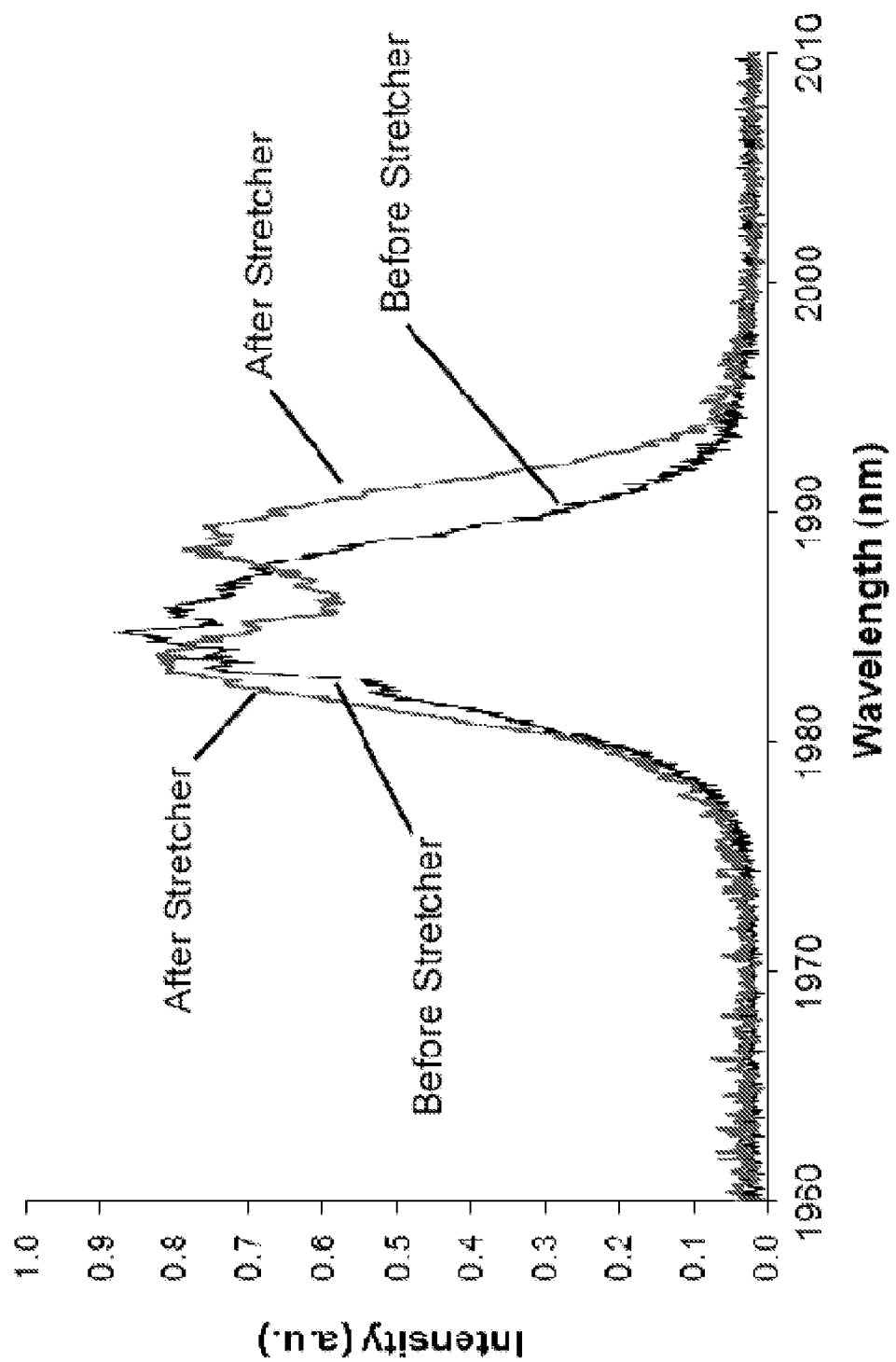
FIG. 5 is a plot of the optical spectrum before and after the fiber stretcher of the first stage amplifier, in accordance with some embodiments.

In some embodiments, the output pulses 137 from the seed laser oscillator are amplified in a first stage amplifier 400. In order to amplify the output pulses 137 from the seed laser oscillator, the output pulses 137 from the seed laser oscillator are first stretched by a spool of normal dispersion fiber 405. The stretcher 405 elongates the pulses to 40 psec duration. Fiber with normal dispersion is used for the stretcher due to the simple configuration of anomalous grating compressors. Alternatively, fiber with anomalous dispersion can be used for the stretcher in combination with a grating compressor with normal dispersion. As a result of the initial chirp of the pulses 137 from the seed laser oscillator, the pulses were compressed within the first meters of the stretching fiber 405 resulting in some spectrum broadening mainly due to self phase modulation as is shown in FIG. 5. The high numerical aperture, stretching fiber 405 had significant fundamental absorption near 2 μm and high splicing loss to the overall single mode fiber 425. A total loss of 13 dB including splicing losses of 1.5 dB from two splices is measurable. A 10 mW output signal from the seed laser oscillator reduces to 0.5 mW after stretching, but is sufficient for high output power with low amplified spontaneous emission (ASE) level.

Figure 6:
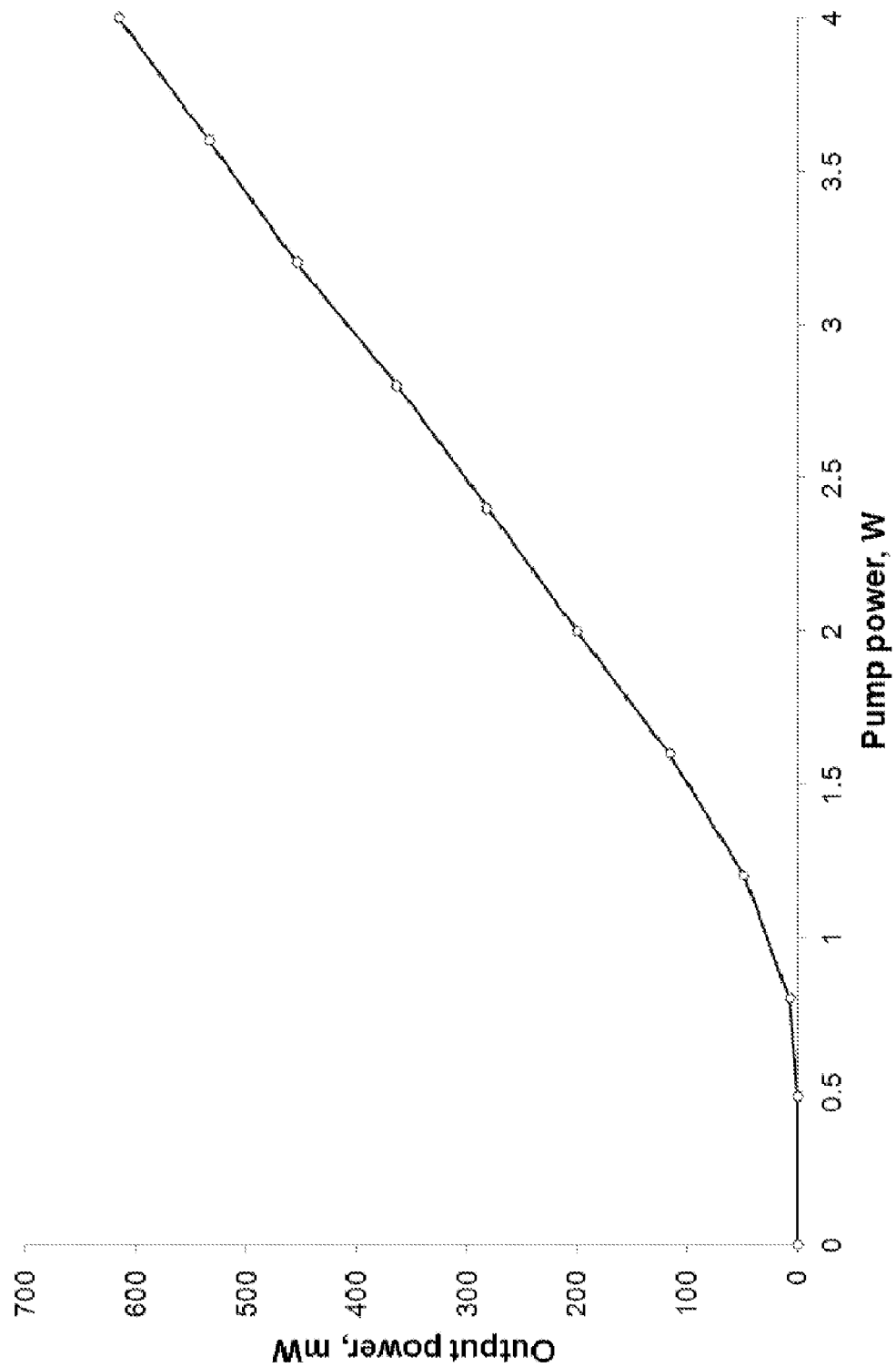
FIG. 6 is a plot of the power of the amplified pulses as a function of pump power, in accordance with some embodiments.
Figure 7:
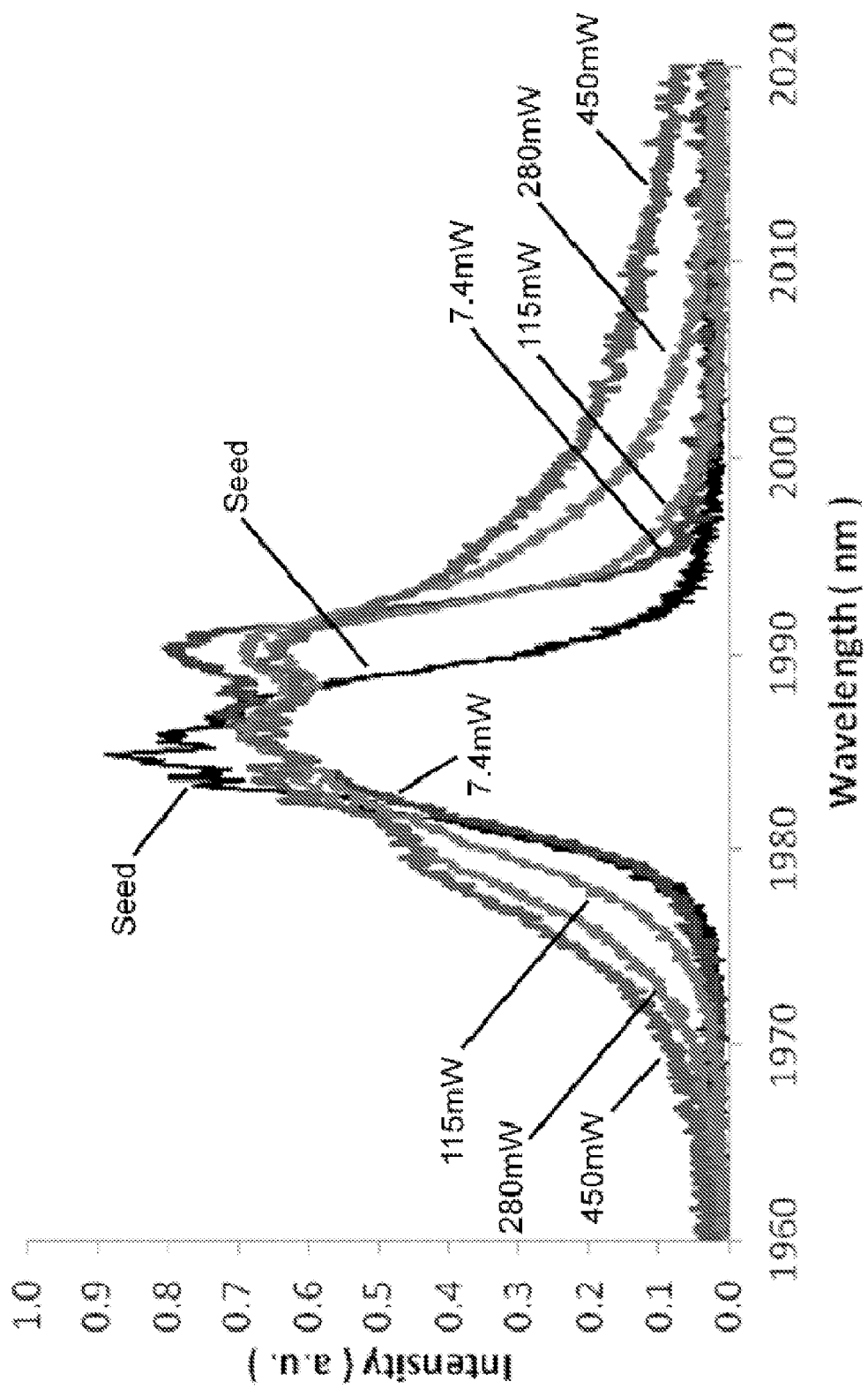
FIG. 7 is a plot of the optical spectrums after the first stage amplifier for different levels of output power, in accordance with some embodiments.

A multimode signal/pump combiner 410 with two pump inputs is used to couple pump power from two multimode laser diodes 415 with a wavelength in the range of 790-796 nm, 1200-1220 nm, or 1570-1620 nm. Next, the pulses are amplified in a double clad Tm doped laser active medium fiber 420. The gain fiber 420 has a 5 m length and a core diameter of 6 μm. In this embodiment, the multimode laser diodes 415 have a wavelength of 793 nm. Alternatively, the pump laser can be one or more single mode laser diodes in combination with a single mode signal/pump combiner. Alternatively, the pump wavelength may be 1210 nm or 1600 nm depending on the medium selected for the gain fiber. Alternative gain mediums for the gain fiber include Holmium and Thulium/Holmium codoped fiber. The gain fiber may be either single clad or double clad having a core diameter ranging from 5 μm to 200 μm with numerical apertures ranging from 0.02 to 0.25. Subsequently, the pump light injected into the cladding of the overall single mode fiber 425 by the inner cladding of the gain fiber 420 is scattered into the ambient air by a pump stripper 430. Finally, a pigtailed polarization maintaining isolator 435 may be spliced to the output of the first stage amplifier. The first stage amplified pulses 440 are then coupled to a second stage of amplification. FIG. 6 shows the power of the amplified pulses 440 as a function of pump power. With increasing average output power, there is a noticeable broadening of the pulse spectrum as is shown in FIG. 7. To minimize the effect of nonlinear spectrum deterioration, the power of the first stage amplified pulses 440 is limited to 115 mW.

Figure 8:
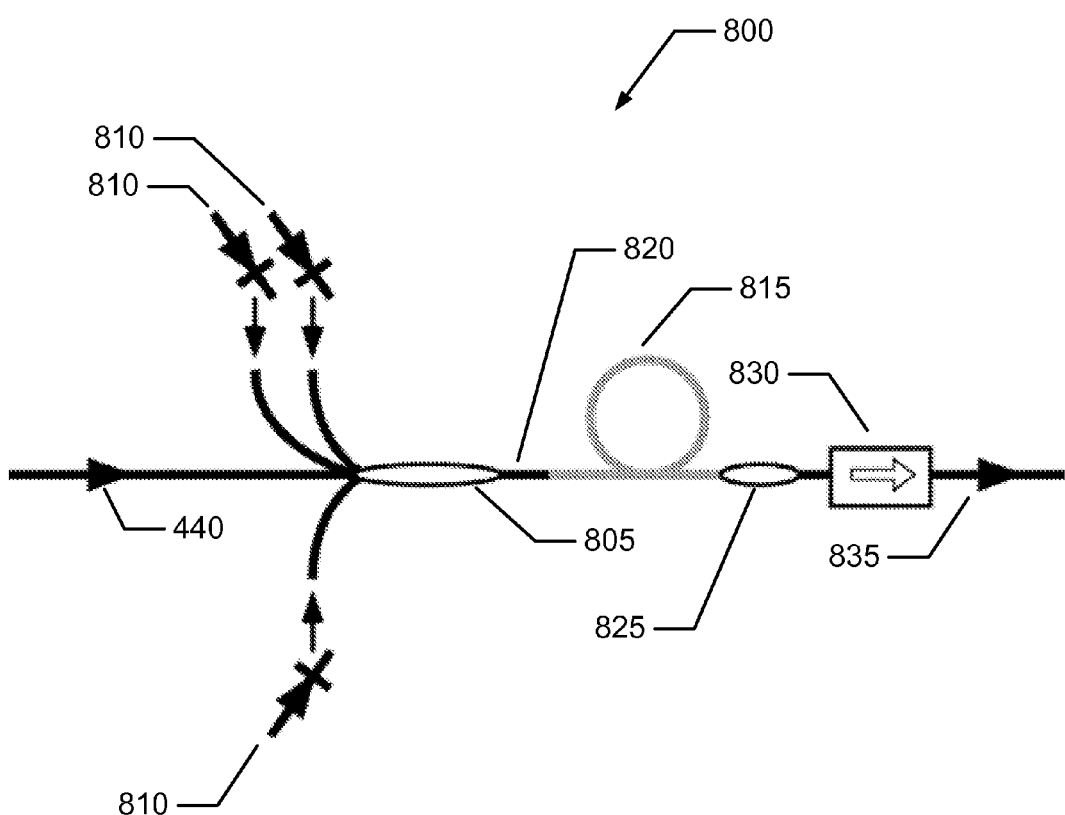
FIG. 8 is a schematic diagram of the second stage amplifier for the 2 μm femtosecond fiber laser, in accordance with some embodiments.

FIG. 8 is a schematic diagram of the second stage amplifier for the 2 μm femtosecond fiber laser, in accordance with some embodiments.

Figure 9:
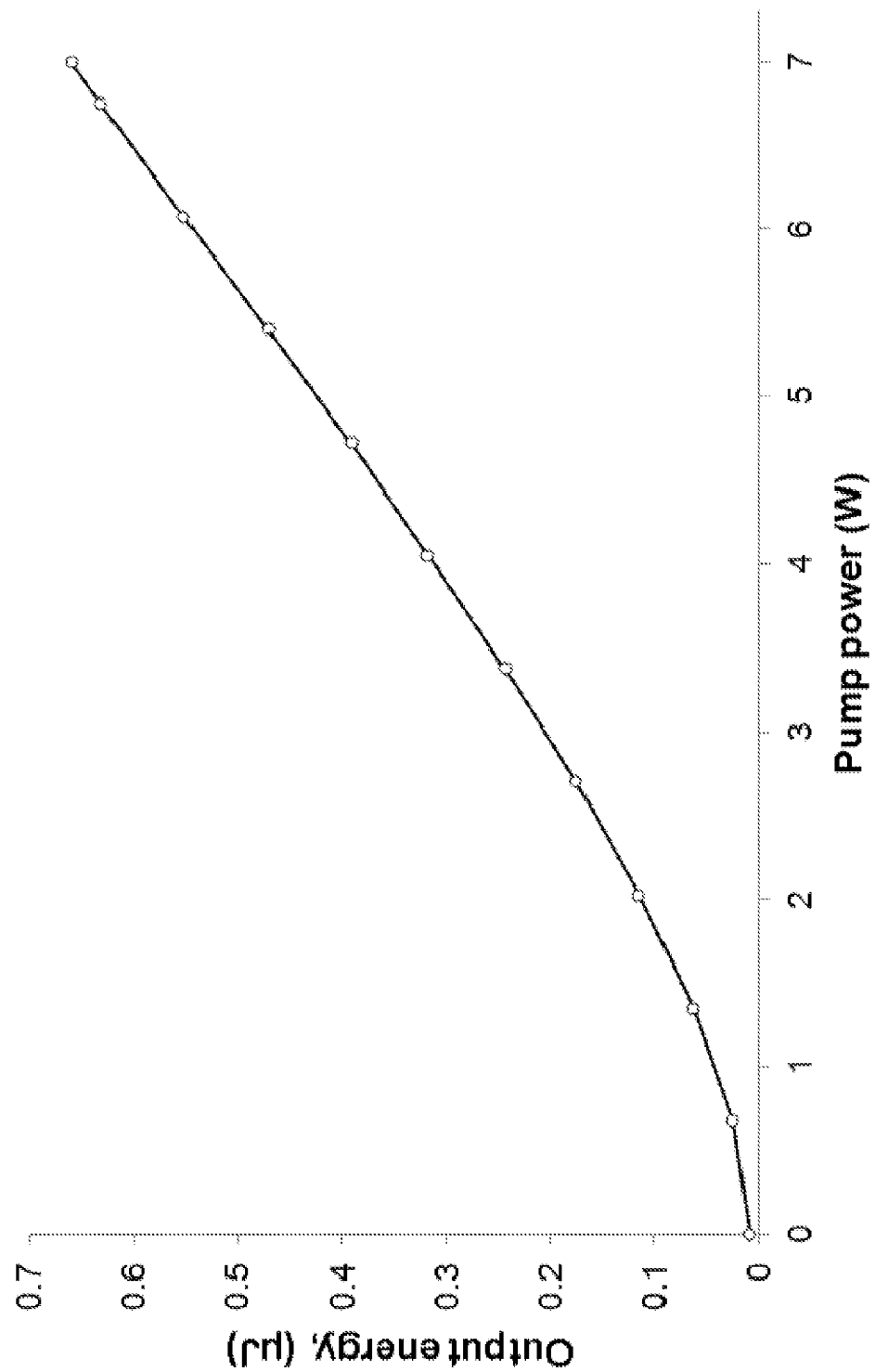
FIG. 9 is a plot of the energy of the twice amplified pulses as a function of pump power, in accordance with some embodiments.
Figure 10:
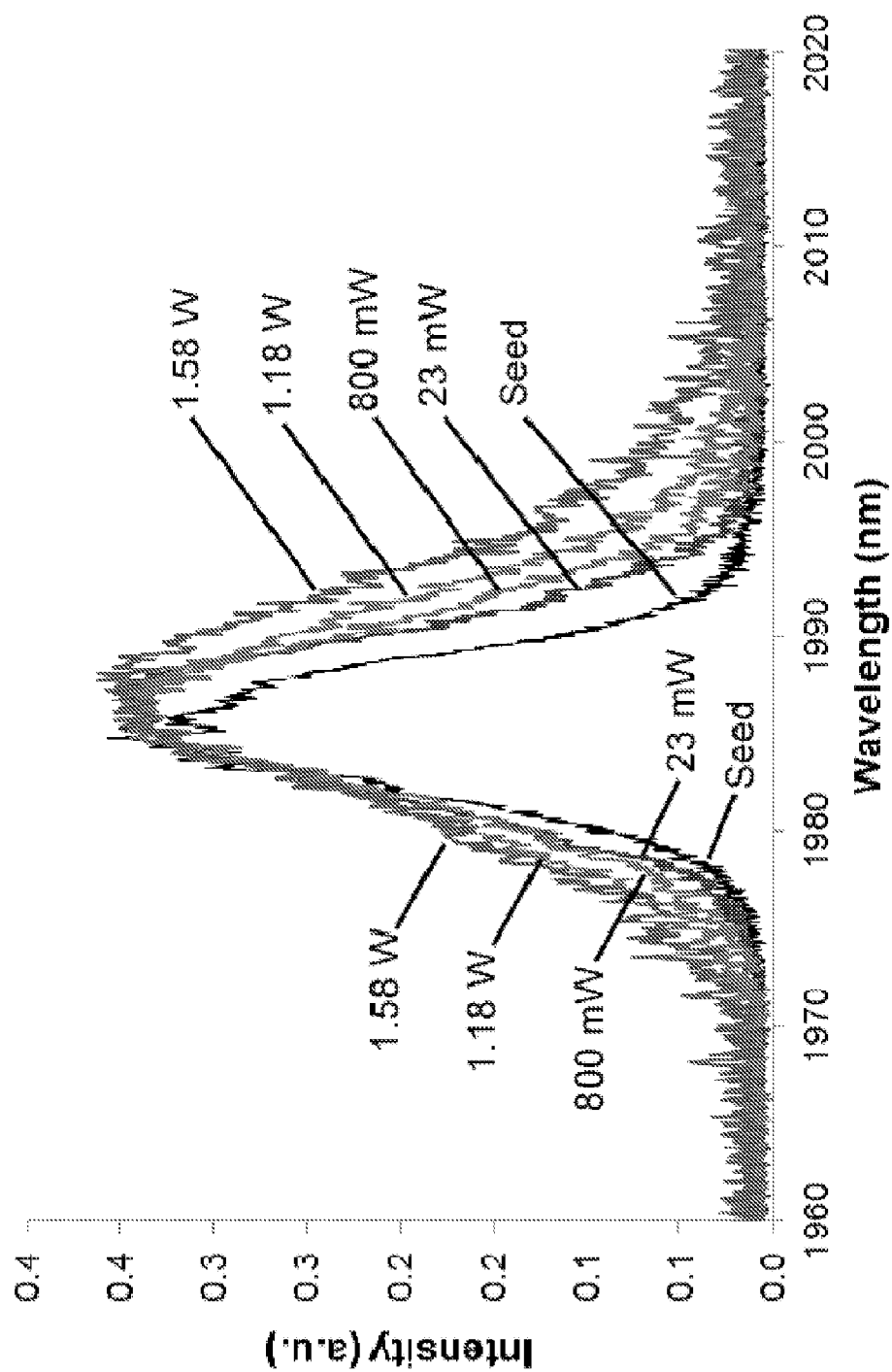
FIG. 10 is a plot of the optical spectrums after the second stage amplifier for different levels of output power, in accordance with some embodiments.
Figure 11:
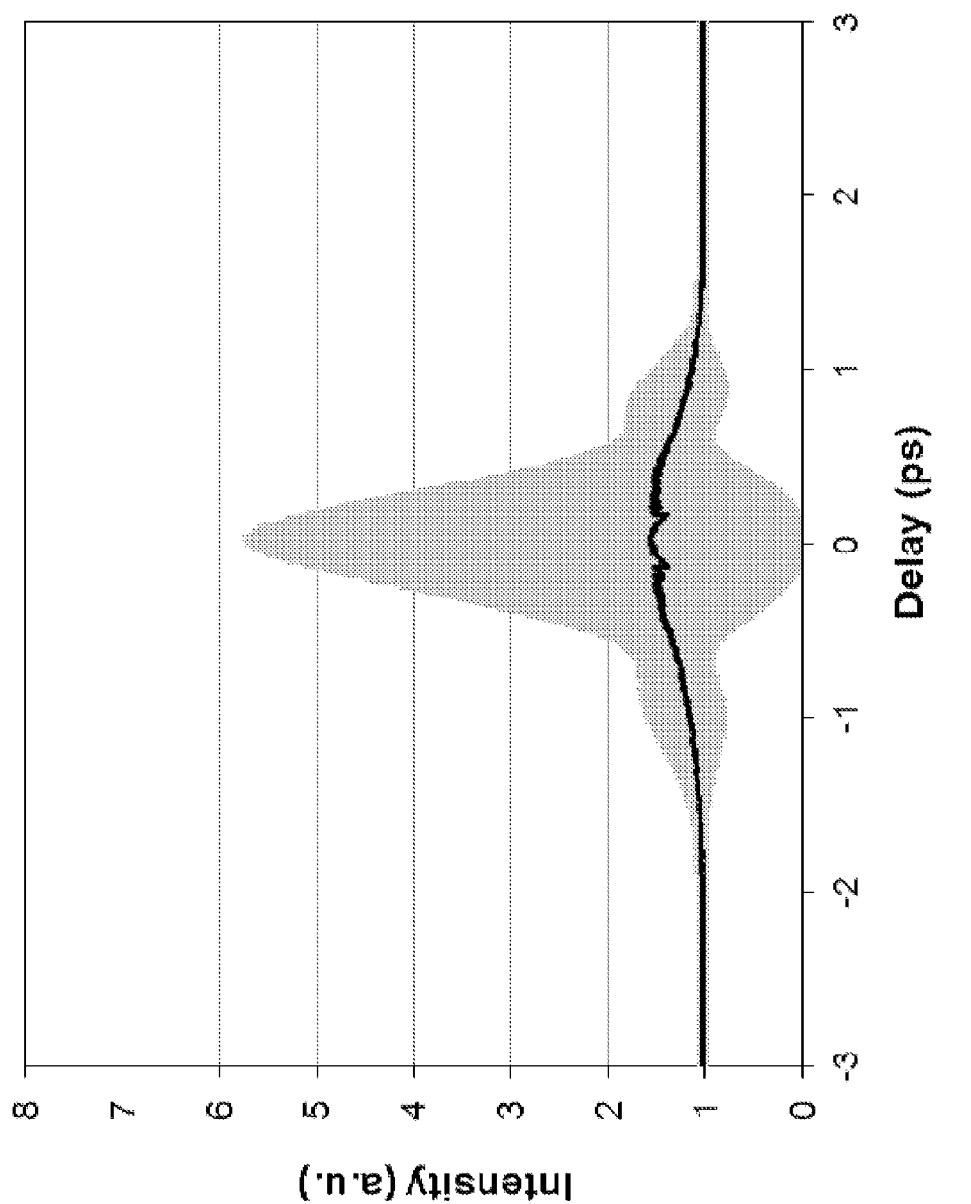
FIG. 11 is an autocorrelation trace of the compressed pulses, in accordance with some embodiments.

In some embodiments, the output pulses 440 from the first stage amplifier are amplified in a second stage amplifier 800. A multimode signal/pump combiner 805 with three pump inputs is used to couple pump power from three multimode laser diodes 810 with a wavelength in the range of 790-796 nm, 1200-1220 nm, or 1570-1620 nm. The three multimode laser diodes provide a total of 7 W of pump power. If more pump power is required, a multimode signal/pump combiner with more inputs may be used in order to couple pump power from more multimode laser diodes. Alternatively, multimode laser diodes with more output power may be used with a multimode signal/pump combiner with fewer inputs. Next, the pulses are amplified in a double clad Tm doped laser active medium fiber 815. The gain fiber 815 has a 5.5 m length and a core diameter of 10 μm. In this embodiment, the multimode laser diodes 810 have a wavelength of 793 nm. Alternatively, the pump laser can be one or more single mode laser diodes in combination with a single mode signal/pump combiner. Alternatively, the pump wavelength may be 1210 nm or 1600 nm depending on the medium selected for the gain fiber. Alternative gain mediums for the gain fiber include Holmium and Thulium/Holmium codoped fiber. The gain fiber may be either single clad or double clad having a core diameter ranging from 5 μm to 200 μm with numerical apertures ranging from 0.02 to 0.25. Subsequently, the pump light injected into the cladding of the overall single mode fiber 820 by the inner cladding of the gain fiber 815 is scattered into the ambient air by a pump stripper 825. If the gain fiber 815 is pumped by one or more single mode laser diodes, then the pump stripper is not required. Finally, a pigtailed polarization maintaining isolator 830 may be spliced to the output of the second stage amplifier. The second stage amplified pulses 835 may then be subsequently compressed. The second stage amplifier amplifies the pulse train up to an average power of 1.6 W or pulse energy of 0.65 μJ. FIG. 9 shows the energy of the twice amplified pulses 835 as a function of pump power. FIG. 10 shows a moderate broadening of the spectrum of output pulses. Even with this broadening, the output pulses are still acceptable for high quality compression. Pulse spectrum can be improved by shortening the length of the gain fiber 815. Power of the twice amplified pulses may further be increased by using large mode area (LMA) fibers with core diameters up to 200 μm and shorter fiber lengths. By making changes to the gain fiber and the pump wavelength and power, the pulse energies may range from 0.1 µJ to 10 mJ. To test the ability to compress the amplified pulses, a traditional two-pass compressor with two, 830 lines/mm gold coated gratings was used. The compressed pulses exhibited a duration of 820 fs and a quadratic chirp due to uncompensated third order dispersion as is shown in the autocorrelation trace in FIG. 11.

Figure 12:
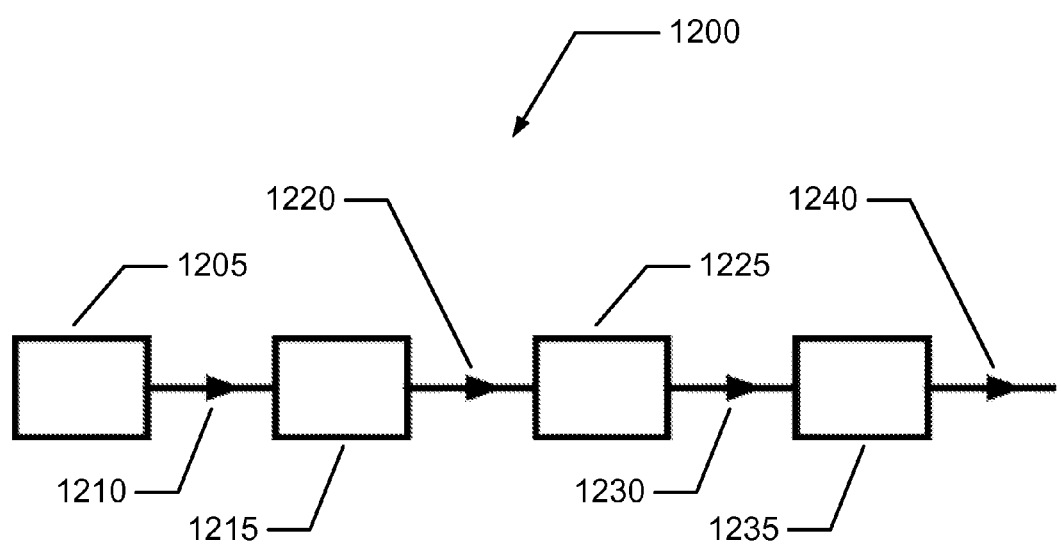
FIG. 12 is a schematic diagram of the 2 μm femtosecond fiber laser, in accordance with some embodiments.

In some embodiments, the output pulses 835 from the second stage amplifier are subsequently amplified in one or more stage amplifiers 800. Each subsequent stage is similar in design and function to the second stage schematically diagramed in FIG. 8. The output power from each stage need only be limited to minimize the effect of nonlinear spectrum deterioration. FIG. 12 shows a block diagram of the 2 µm femotosecond fiber laser 1200 in accordance with some embodiments. First a seed laser oscillator 1205 generates pulses 1210 that are coupled to a first amplifier stage 1215. The pulses from the first amplifier stage 1220 are then subsequently coupled into a chain of one or more amplifier stages 1225. The pulses from the one or more amplifier stages 1230 are then compressed within a compressor 1235 to yield 2 µm femtosecond laser pulses 1240.

Figure 13:
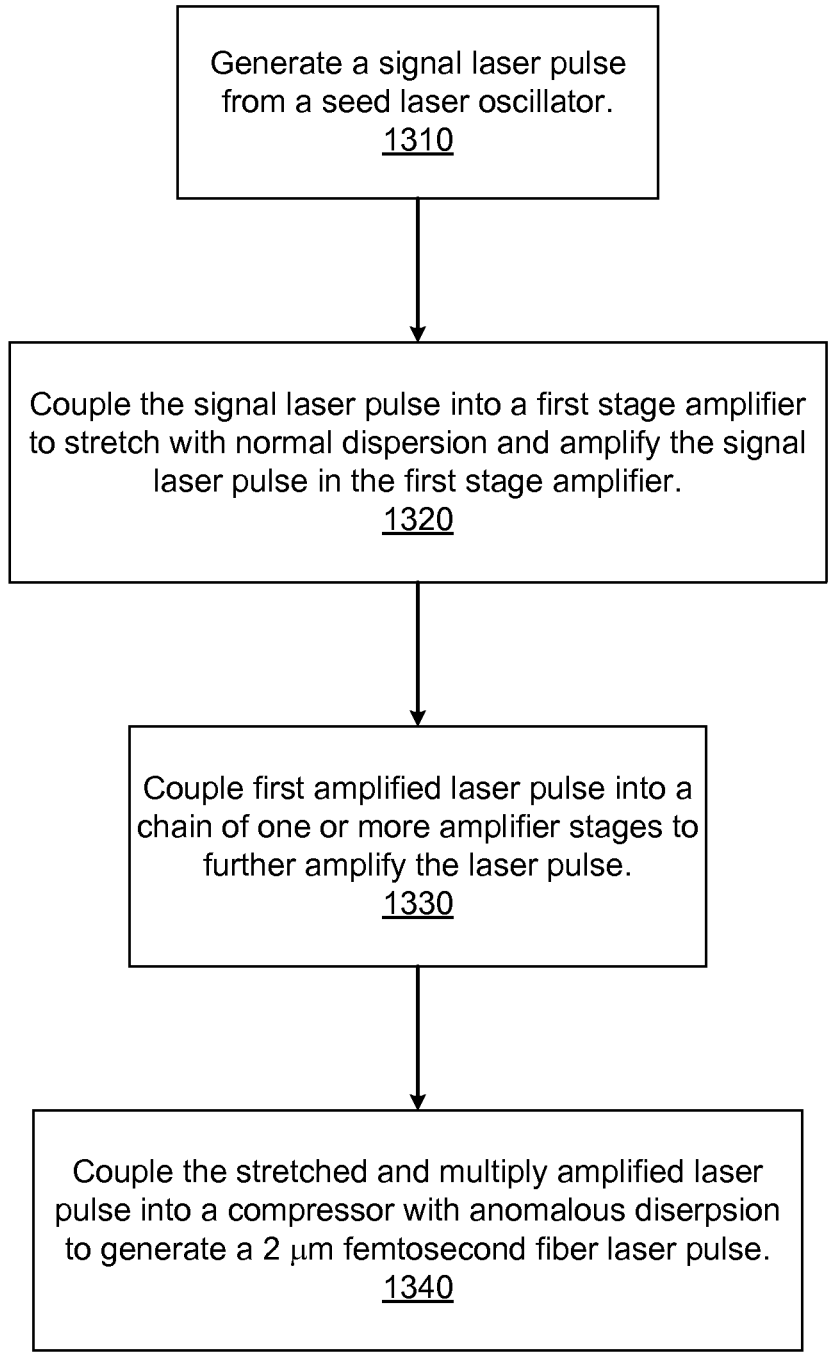
FIG. 13 is a block diagram illustrating a method for generating 2 μm femtosecond fiber laser pulses, in accordance with some embodiments.

FIG. 13 is a block diagram illustrating a method for generating 2 µm femtosecond fiber laser pulses, in accordance with some embodiments.

In some embodiments, a seed laser oscillator is used to generate a signal laser pulse 1310. The signal laser pulse in then coupled to a first stage amplifier where the signal laser pulse is first stretched with normal dispersion and then subsequently amplified 1320. The laser pulse from the first stage amplifier is then coupled into a chain of one or more amplifier stages 1330. The stretched and multiply amplified laser pulse is then compressed with anomalous dispersion to generate a 2 µm femtosecond fiber laser pulse 1340. In the alternative, the signal laser may be stretched with anomalous dispersion prior to amplification and then ultimately compressed with normal dispersion.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fiber laser comprising:
   a seed laser oscillator comprising an output, wherein the seed laser oscillator comprises a linear cavity or a ring cavity;
   a first amplifier stage comprising:
      an input and an output;
      a spool of dispersion fiber comprising an input and an output, wherein the output of the seed laser oscillator is coupled to the input of the spool of dispersion fiber;
      one or more pump diodes;
      a signal/pump combiner comprising an input and an output, wherein the one or more pump diodes and the output of the spool of dispersion fiber are coupled to the input of the signal/pump combiner;
      a gain fiber comprising a doped gain medium, an input, and an output, wherein the output of the signal/pump combiner is coupled to the input of the gain fiber; and
      a polarization maintaining isolator comprising an input and an output, wherein the output of the gain fiber is coupled to the input of the polarization maintaining isolator and the output of the polarization maintaining isolator is configured to emit a stretched and amplified laser pulse;
      wherein the output of the seed laser oscillator is coupled to the input of the first stage amplifier; and
   an amplifier chain comprising:
      an input and an output; and
      one or more amplifier units comprising:
         one or more pump diodes;
         a signal/pump combiner comprising an input and an output, wherein the one or more pump diodes and the output of the first amplifier stage are coupled to the input of the signal/pump combiner;
         a gain fiber comprising a doped gain medium, an input, and an output, wherein the output of the signal/pump combiner is coupled to the input of the gain fiber; and
         a polarization maintaining isolator comprising an input and an output, wherein the output of the gain fiber is coupled to the input of the polarization maintaining isolator and the output of the polarization maintaining isolator is configured to emit an amplified laser pulse;
      wherein the input of the amplifier chain is coupled to the output of the first amplifier stage and the output of the amplifier chain is configured to emit the amplified laser pulse.

2. The fiber laser of claim 1, wherein the amplified laser pulse has an energy ranging from 0.1 µJ to 10 mJ.

3. The fiber laser of claim 1, wherein the amplified laser pulse has a wavelength ranging from 1850 nm to 2100 nm.

4. The fiber laser of claim 1, wherein the fiber laser further comprises a compressor comprising an input and an output, wherein the input of the compressor is coupled to the output of the amplifier chain and the compressor is configured for anomalous dispersion of the amplified laser pulse to emit a femtosecond laser pulse from the output of the compressor.

5. The fiber laser of claim 1, wherein the fiber laser further comprises a compressor comprising an input and an output, wherein the input of the compressor is coupled to the output of the amplifier chain and the compressor is configured for normal dispersion of the amplified laser pulse to emit a femtosecond laser pulse from the output of the compressor.

6. The fiber laser of claim 1, wherein the linear cavity comprises:
a fiber reflector;
a dispersion compensating fiber comprising an input and an output, wherein the fiber reflector is coupled to the input of the dispersion compensating fiber;
an output coupler comprising a first port, a second port, and an output, wherein the output of the dispersion compensating fiber is coupled to the first port of the output coupler;
one or more pump diodes;
a signal/pump combiner comprising an input and an output, wherein the one or more pump diodes and the second port of the output coupler are coupled to the input of the signal/pump combiner;
a gain fiber comprising a doped gain medium, an input, and an output, wherein the output of the signal/pump combiner is coupled to the input of the gain fiber;
a SESAM coupled to the output of the gain fiber;
a polarization maintaining isolator comprising an input and an output, wherein the output of the signal/pump combiner is coupled to the input of the polarization maintaining isolator and the output of the polarization maintaining isolator is configured to emit a signal laser pulse.

7. The fiber laser of claim 6, wherein the one or more pump diodes and the signal/pump combiner are multimode and the linear cavity further comprises a pump stripper coupled between the gain fiber and the SESAM.

8. The fiber laser of claim 6, wherein the signal laser pulse has a pulse repetition rate ranging from 100 kHz to 1,000 MHz.

9. The fiber laser of claim 6, wherein the one or more pump diodes have a wavelength ranging from 790 nm to 796 nm.

10. The fiber laser of claim 6, wherein the one or more pump diodes have a wavelength ranging from 1200 nm to 1220 nm.

11. The fiber laser of claim 6, wherein the one or more pump diodes have a wavelength ranging from 1570 nm to 1620 nm.

12. The fiber laser of claim 6, wherein the doped gain medium is at least one of: Thulium, Holmium, and Thulium/Holmium.

13. The fiber laser of claim 6, wherein the gain fiber comprises a single cladding or a double cladding.

14. The fiber laser of claim 6, wherein the gain fiber comprises a core size ranging from 5 μm to 200 μm.

15. The fiber laser of claim 6, wherein the gain fiber comprises a numerical aperture ranging from 0.02 to 0.25.

16. The fiber laser of claim 1, wherein the ring cavity comprises:
one or more pump diodes;
a signal/pump combiner comprising an input and an output, wherein the one or more pump diodes are coupled to the input of the signal/pump combiner;
a gain fiber comprising a doped gain medium, an input, and an output, wherein the output of the signal/pump combiner is coupled to the input of the gain fiber;
an output coupler comprising a first port, a second port, and an output, wherein the output of the gain fiber is coupled to the first port of the output coupler and the output of the output coupler is configured to emit a signal laser pulse;
a first in line polarization controller comprising an input and an output, wherein the second port of the output coupler is coupled to the input of the first in line polarization controller;
an in line polarization isolator comprising an input and an output, wherein the output of the first in line polarization controller is coupled to the input of the in line polarization isolator;
a second in line polarization controller comprising an input and an output, wherein the output of the in line polarization isolator is coupled to the input of the second in line polarization controller; and
a dispersion compensating fiber comprising an input and an output, wherein the output of the second in line polarization controller is coupled to the input of the dispersion compensating fiber and the input of the signal/pump combiner is coupled to the output of the dispersion compensating fiber.

17. The fiber laser of claim 16, wherein the one or more pump diodes and the signal/pump combiner are multimode and the ring cavity further comprises a pump stripper coupled between the gain fiber and the output coupler.

18. The fiber laser of claim 16, wherein the one or more pump diodes have a wavelength ranging from 790 nm to 796 nm.

19. The fiber laser of claim 16, wherein the one or more pump diodes have a wavelength ranging from 1200 nm to 1220 nm.

20. The fiber laser of claim 16, wherein the one or more pump diodes have a wavelength ranging from 1570 nm to 1620 nm.

21. The fiber laser of claim 16, wherein the doped gain medium is at least one of: Thulium, Holmium, and Thulium/Holmium.

22. The fiber laser of claim 16, wherein the gain fiber comprises a single cladding or a double cladding.

23. The fiber laser of claim 16, wherein the gain fiber comprises a core size ranging from 5 μm to 200 μm.

24. The fiber laser of claim 16, wherein the gain fiber comprises a numerical aperture ranging from 0.02 to 0.25.

25. The fiber laser of claim 1, wherein the one or more pump diodes of the first amplifier stage and the signal/pump combiner of the first amplifier stage are multimode and the first amplifier stage further comprises a pump stripper coupled between the gain fiber of the first amplifier stage and the polarization maintaining isolator of the first amplifier stage.

26. The fiber laser of claim 1, wherein the spool of dispersion fiber comprises normal dispersion fiber or anomalous dispersion fiber.

27. The fiber laser of claim 1, wherein the one or more pump diodes of the first amplifier stage have a wavelength ranging from 790 nm to 796 nm.

28. The fiber laser of claim 1, wherein the one or more pump diodes of the first amplifier stage have a wavelength ranging from 1200 nm to 1220 nm.

29. The fiber laser of claim 1, wherein the one or more pump diodes of the first amplifier stage have a wavelength ranging from 1570 nm to 1620 nm.

30. The fiber laser of claim 1, wherein the doped gain medium of the first amplifier stage is at least one of: Thulium, Holmium, and Thulium/Holmium.

31. The fiber laser of claim 1, wherein the gain fiber of the first amplifier stage comprises a single cladding or a double cladding.

32. The fiber laser of claim 1 wherein the gain fiber of the first amplifier stage comprises a core size ranging from 5 μm to 200 μm.

33. The fiber laser of claim 1, wherein the gain fiber of the first amplifier stage comprises a numerical aperture ranging from 0.02 to 0.25.

34. The fiber laser of claim 1, wherein the one or more pump diodes of the amplifier chain and the signal/pump combiner of the amplifier chain are multimode and the one or more amplifier units further comprises a pump stripper coupled between the gain fiber of the amplifier chain and the polarization maintaining isolator of the amplifier chain.

35. The fiber laser of claim 1, wherein the one or more pump diodes of the amplifier chain have a wavelength ranging from 790 nm to 796 nm.

36. The fiber laser of claim 1, wherein the one or more pump diodes of the amplifier chain have a wavelength ranging from 1200 nm to 1220 nm.

37. The fiber laser of claim 1, wherein the one or more pump diodes of the amplifier chain have a wavelength ranging from 1570 nm to 1620 nm.

38. The fiber laser of claim 1, wherein the doped gain medium of the amplifier chain is at least one of: Thulium, Holmium, and Thulium/Holmium.

39. The fiber laser of claim 1, wherein the gain fiber of the amplifier chain comprises a single cladding or a double cladding.

40. The fiber laser of claim 1, wherein the gain fiber of the amplifier chain comprises a core size ranging from 5 μm to 200 μm.

41. The fiber laser of claim 1, wherein the gain fiber of the amplifier chain comprises a numerical aperture ranging from 0.02 to 0.25.

42. A method for generating femtosecond fiber laser pulses, the method comprising:
  generating a signal laser pulse from a seed laser oscillator, wherein the seed laser oscillator comprises a linear cavity or a ring cavity;
  using a first amplifier stage comprising:
    an input and an output;
    a spool of dispersion fiber comprising an input and an output, wherein the output of the seed laser oscillator is coupled to the input of the spool of dispersion fiber;
    one or more pump diodes;
    a signal/pump combiner comprising an input and an output, wherein the one or more pump diodes and the output of the spool of dispersion fiber are coupled to the input of the signal/pump combiner;
    a gain fiber comprising a doped gain medium, an input, and an output, wherein the output of the signal/pump combiner is coupled to the input of the gain fiber; and
    a polarization maintaining isolator comprising an input and an output, wherein the output of the gain fiber is coupled to the input of the polarization maintaining isolator and the output of the polarization maintaining isolator is configured to emit an amplified and stretched signal laser pulse;
  wherein the signal laser pulse is coupled into the input of the first stage amplifier and the output of the first amplifier stage emits the amplified and stretched signal laser pulse;
  using an amplifier chain comprising:
    an input and an output; and
    one or more amplifier units comprising:
      one or more pump diodes;
      a signal/pump combiner comprising an input and an output, wherein the one or more pump diodes and the output of the first amplifier stage are coupled to the input of the signal/pump combiner;
      a gain fiber comprising a doped gain medium, an input, and an output, wherein the output of the signal/pump combiner is coupled to the input of the gain fiber; and
      a polarization maintaining isolator comprising an input and an output, wherein the output of the gain fiber is coupled to the input of the polarization maintaining isolator and the output of the polarization maintaining isolator is configured to emit a further amplified, stretched signal laser pulse;
  wherein the amplified and stretched signal laser pulse from the output of the first amplifier stage is coupled into the input of the amplifier chain and the output of the amplifier chain emits the further amplified, stretched signal laser pulse.

43. The method of claim 42, wherein the further amplified, stretched signal laser pulse has an energy ranging from 0.1 μJ to 10 mJ.

44. The method of claim 42, wherein the further amplified, stretched signal laser pulse has a wavelength ranging from 1850 nm to 2100 nm.

45. The method of claim 42, wherein the method further comprises:
  using a compressor comprising an input and an output, wherein the input of the compressor is coupled to the output of the amplifier chain and the compressor is configured for anomalous dispersion of the further amplified, stretched signal laser pulse to emit a femtosecond laser pulse from the output of the compressor.

46. The method of claim 42, wherein the method further comprises:
  using a compressor comprising an input and an output, wherein the input of the compressor is coupled to the output of the amplifier chain and the compressor is configured for normal dispersion of the further amplified, stretched signal laser pulse to emit a femtosecond laser pulse from the output of the compressor.

47. The method of claim 42, wherein the linear cavity comprises:
  a fiber reflector;
  a dispersion compensating fiber comprising an input and an output, wherein the fiber reflector is coupled to the input of the dispersion compensating fiber;
  an output coupler comprising a first port, a second port, and an output, wherein the output of the dispersion compensating fiber is coupled to the first port of the output coupler;
  one or more pump diodes;
  a signal/pump combiner comprising an input and an output, wherein the one or more pump diodes and the second port of the output coupler are coupled to the input of the signal/pump combiner;
  a gain fiber comprising a doped gain medium, an input, and an output, wherein the output of the signal/pump combiner is coupled to the input of the gain fiber;
  a SESAM coupled to the output of the gain fiber;
  a polarization maintaining isolator comprising an input and an output, wherein the output of the signal/pump combiner is coupled to the input of the polarization maintaining isolator and the output of the polarization maintaining isolator is configured to emit the signal laser pulse.

48. The method of claim 47, wherein the one or more pump diodes and the signal/pump combiner are multimode and the linear cavity further comprises a pump stripper coupled between the gain fiber and the SESAM.

49. The method of claim 47, wherein the signal laser pulse has a pulse repetition rate ranging from 100 kHz to 1,000 MHz.

50. The method of claim 47, wherein the one or more pump diodes have a wavelength ranging from 790 nm to 796 nm.

51. The method of claim 47, wherein the one or more pump diodes have a wavelength ranging from 1200 nm to 1220 nm.

52. The method of claim 47, wherein the one or more pump diodes have a wavelength ranging from 1570 nm to 1620 nm.

53. The method of claim 47, wherein the doped gain medium is at least one of: Thulium, Holmium, and Thulium/Holmium.

54. The method of claim 47, wherein the gain fiber comprises a single cladding or a double cladding.

55. The method of claim 47, wherein the gain fiber comprises a core size ranging from 5 µm to 200 µm.

56. The method of claim 47, wherein the gain fiber comprises a numerical aperture ranging from 0.02 to 0.25.

57. The method of claim 42, wherein the ring cavity comprises:
one or more pump diodes;
a signal/pump combiner comprising an input and an output, wherein the one or more pump diodes are coupled to the input of the signal/pump combiner;
a gain fiber comprising a doped gain medium, an input, and an output, wherein the output of the signal/pump combiner is coupled to the input of the gain fiber;
an output coupler comprising a first port, a second port, and an output, wherein the output of the gain fiber is coupled to the first port of the output coupler and the output of the output coupler is configured to emit the signal laser pulse;
a first in line polarization controller comprising an input and an output, wherein the second port of the output coupler is coupled to the input of the first in line polarization controller;
an in line polarization isolator comprising an input and an output, wherein the output of the first in line polarization controller is coupled to the input of the in line polarization isolator;
a second in line polarization controller comprising an input and an output, wherein the output of the in line polarization isolator is coupled to the input of the second in line polarization controller; and
a dispersion compensating fiber comprising an input and an output, wherein the output of the second in line polarization controller is coupled to the input of the dispersion compensating fiber and the input of the signal/pump combiner is coupled to the output of the dispersion compensating fiber.

58. The method of claim 57, wherein the one or more pump diodes and the signal/pump combiner are multimode and the ring cavity further comprises a pump stripper coupled between the gain fiber and the output coupler.

59. The method of claim 57, wherein the one or more pump diodes have a wavelength ranging from 790 nm to 796 nm.

60. The method of claim 57, wherein the one or more pump diodes have a wavelength ranging from 1200 nm to 1220 nm.

61. The method of claim 57, wherein the one or more pump diodes have a wavelength ranging from 1570 nm to 1620 nm.

62. The method of claim 57, wherein the doped gain medium is at least one of: Thulium, Holmium, and Thulium/Holmium.

63. The method of claim 57, wherein the gain fiber comprises a single cladding or a double cladding.

64. The method of claim 57, wherein the gain fiber comprises a core size ranging from 5 µm to 200 µm.

65. The method of claim 57, wherein the gain fiber comprises a numerical aperture ranging from 0.02 to 0.25.

66. The method of claim 42, wherein the one or more pump diodes of the first amplifier stage and the signal/pump combiner of the first amplifier stage are multimode and the first amplifier stage further comprises a pump stripper coupled between the gain fiber of the first amplifier stage and the polarization maintaining isolator of the first amplifier stage.

67. The method of claim 42, wherein the spool of dispersion fiber comprises normal dispersion fiber or anomalous dispersion fiber.

68. The method of claim 42, wherein the one or more pump diodes of the first amplifier stage have a wavelength ranging from 790 nm to 796 nm.

69. The method of claim 42, wherein the one or more pump diodes of the first amplifier stage have a wavelength ranging from 1200 nm to 1220 nm.

70. The method of claim 42, wherein the one or more pump diodes of the first amplifier stage have a wavelength ranging from 1570 nm to 1620 nm.

71. The method of claim 42, wherein the doped gain medium of the first amplifier stage is at least one of: Thulium, Holmium, and Thulium/Holmium.

72. The method of claim 42, wherein the gain fiber of the first amplifier stage comprises a single cladding or a double cladding.

73. The method of claim 42, wherein the gain fiber of the first amplifier stage comprises a core size ranging from 5 µm to 200 µm.

74. The method of claim 42, wherein the gain fiber of the first amplifier stage comprises a numerical aperture ranging from 0.02 to 0.25.

75. The method of claim 42, wherein the one or more pump diodes of the amplifier chain and the signal/pump combiner of the amplifier chain are multimode and the one or more amplifier units further comprises a pump stripper coupled between the gain fiber of the amplifier chain and the polarization maintaining isolator of the amplifier chain.

76. The method of claim 42, wherein the one or more pump diodes of the amplifier chain have a wavelength ranging from 790 nm to 796 nm.

77. The method of claim 42, wherein the one or more pump diodes of the amplifier chain have a wavelength ranging from 1200 nm to 1220 nm.

78. The method of claim 42, wherein the one or more pump diodes of the amplifier chain have a wavelength ranging from 1570 nm to 1620 nm.

79. The method of claim 42, wherein the doped gain medium of the amplifier chain is at least one of: Thulium, Holmium, and Thulium/Holmium.

80. The method of claim 42, wherein the gain fiber of the amplifier chain comprises a single cladding or a double cladding.

81. The method of claim 42, wherein the gain fiber of the amplifier chain comprises a core size ranging from 5 µm to 200 µm.

82. The method of claim 42, wherein the gain fiber of the amplifier chain comprises a numerical aperture ranging from 0.02 to 0.25.

* * * * *